(12) United States Patent
Yamazaki et al.

(10) Patent No.: US 11,828,973 B2
(45) Date of Patent: Nov. 28, 2023

(54) ILLUMINATION DEVICE (71) Applicant: Mitsubishi Electric Corporation, Tokyo (JP)

(72) Inventors: Haruka Yamazaki, Tokyo (JP); Satoru Okagaki, Tokyo (JP); Yusuke Fujii, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 65 days.

(21) Appl. No.: 17/636,380

(22) PCT Filed: Aug. 27, 2019

(86) PCT No.: PCT/JP2019/033453
§ 371 (c)(1),
(2) Date: Feb. 18, 2022

(87) PCT Pub. No.: WO2021/038709
PCT Pub. Date: Mar. 4, 2021

(65) Prior Publication Data
US 2022/0268988 A1 Aug. 25, 2022

(51) Int. Cl.
*F21V 8/00* (2006.01)
(52) U.S. Cl.
CPC ......... *G02B 6/0055* (2013.01); *G02B 6/0031* (2013.01); *G02B 6/0088* (2013.01)
(58) Field of Classification Search
CPC ... G02B 6/0055; G02B 6/0031; G02B 6/0088
See application file for complete search history.

(56) References Cited

U.S. PATENT DOCUMENTS

| 5,530,571 | A | * | 6/1996 | Chen | G02B 6/0051 |
| | | | | | 349/112 |
| 2006/0274551 | A1 | * | 12/2006 | Takada | G02B 6/0055 |
| | | | | | 362/611 |

(Continued)

FOREIGN PATENT DOCUMENTS

| JP | 8-190023 A | 7/1996 |
| JP | 10-161119 A | 6/1998 |

(Continued)

OTHER PUBLICATIONS

Japanese Office Action dated Jul. 19, 2022, in Japanese Application No. 2021-541831.

(Continued)

*Primary Examiner* — Bryon T Gyllstrom
(74) *Attorney, Agent, or Firm* — XSENSUS LLP (57) ABSTRACT

An illumination device that simulates the sky, includes a light source that emits first light; a light-emitting part that allows the first light to enter, guides the entered first light by means of total reflection while scattering the first light, and emits the scattered light from a light emission surface; a back surface reflective part that is provided to face a back surface as a surface of the light-emitting part on a side opposite to the light emission surface and reflects light emitted from the back surface of the light-emitting part; a frame that includes a part situated at least in front of the light emission surface of the light-emitting part; and an optical member that is provided between the light emission surface of the light-emitting part and the part of the frame and reflects a part of the light emitted from the light emission surface of the light-emitting part.

15 Claims, 9 Drawing Sheets

(56) References Cited

U.S. PATENT DOCUMENTS

| | | | | |
|---|---|---|---|---|
| 2009/0269008 A1* | 10/2009 | Fukuda | ................ | G02B 6/0041 385/36 |
| 2009/0302204 A1* | 12/2009 | Saito | .................. | G01N 21/8806 362/296.01 |
| 2012/0033442 A1* | 2/2012 | Kamikatano | .......... | G02B 30/27 362/602 |
| 2013/0063964 A1* | 3/2013 | Meir | ...................... | G02B 6/005 362/555 |
| 2016/0299284 A1* | 10/2016 | Shei | ...................... | G02B 6/0088 |
| 2018/0017233 A1* | 1/2018 | Takeshita | ................. | F21V 13/10 |
| 2018/0098399 A1* | 4/2018 | Takeshita | .............. | F21V 7/0008 |
| 2018/0274752 A1 | 9/2018 | Takeshita et al. | | |
| 2021/0190279 A1* | 6/2021 | Fujii | ...................... | F21S 8/033 |

FOREIGN PATENT DOCUMENTS

| | | |
|---|---|---|
| JP | 2003-278376 A | 10/2003 |
| JP | 2011-99899 A | 5/2011 |
| JP | 2012-69245 A | 4/2012 |
| JP | 2012-88661 A | 5/2012 |
| JP | 2015-76357 A | 4/2015 |
| JP | 2017-183118 A | 10/2017 |
| JP | 2018-10755 A | 1/2018 |
| JP | 2018-60624 A | 4/2018 |
| JP | 2018-170132 A | 11/2018 |
| WO | 2007/029679 A1 | 3/2007 |
| WO | 2008/081383 A1 | 7/2008 |
| WO | 2011/025017 A1 | 3/2011 |
| WO | 2018/140768 A1 | 8/2018 |
| WO | 2019/220656 A1 | 11/2019 |
| WO | 2020/240664 A1 | 12/2020 |

OTHER PUBLICATIONS

Extended European Search Report dated Apr. 13, 2022, in corresponding European Patent Application 19943422.6, 7 pp.
International Search Report and Written Opinion dated Nov. 19, 2019, received for PCT Application PCT/JP2019/033453, Filed on Aug. 27, 2019, 9 pages including English Translation.

* cited by examiner

ILLUMINATION DEVICE

CROSS-REFERENCE TO RELATED APPLICATION

The present application is based on PCT filing PCT/JP2019/033453, filed Aug. 27, 2019, the entire contents of which are incorporated herein by reference.

TECHNICAL FIELD

The present invention relates to an illumination device.

BACKGROUND ART

Patent Reference 1 proposes an illumination device that reproduces a simulated sky. This illumination device includes a reflective layer, a light diffusion layer having light permeability and arranged on a front surface's side of the reflective layer, a scattering panel having light permeability and arranged on a front surface's side of the light diffusion layer, a light source arranged between the light diffusion layer and the scattering panel, and a housing storing these components. The housing includes a frame as a frame body part in the vicinity of outer peripheral edges of the scattering panel. Light emitted from the light source undergoes light diffusion and transmission at the light diffusion layer, light reflection at the reflective layer, light reflection, scattering and transmission at the scattering panel, and so forth, for example, and is thereafter emitted from a light emission surface as a front surface of the scattering panel through an opening at the center of the frame.

PRIOR ART REFERENCE

Patent Reference

Patent Reference 1: Japanese Patent Application Publication No. 2018-60624

SUMMARY OF THE INVENTION

Problem to be Solved by the Invention

In general, scattered light occurring inside a scatterer has no directivity and heads in all directions. In order to extract such scattered light heading in all directions from the light emission surface, the illumination device is provided with a reflective plate or the like on a side of a back surface as a surface opposing the light emission surface and thereby increases light utilization efficiency. However, in such a configuration including the reflective plate provided on the back surface's side of the scatterer opposite to the light emission surface, if a frame member or the like having high reflectance exists in front of the light emission surface, there is a problem in that a bright spot (i.e., a region where the luminance is higher compared to other regions) occurs on the back surface of the scatterer, especially in the vicinity of a region facing the frame member situated on the opposite side. In contrast, if a frame member or the like having a high absorption rate exists in front of the light emission surface, there is a problem in that a dark spot (i.e., a region where the luminance is lower compared to other regions) occurs on the back surface of the scatterer, especially in the vicinity of the region facing the frame member situated on the opposite side.

Incidentally, although the illumination device described in the Patent Reference 1 also includes the reflective layer and it can be considered that a problem similar to the above-described problem occurs in a case where a member that holds the scattering plate is formed with a member having high reflectance such as metal, for example, the Patent Reference 1 discloses nothing in regard to the reflectance of the member that holds the scattering plate.

If the scattering plate has unnatural luminance distribution such as the bright spot or the dark spot due to the frame member, it is difficult for the reproduced simulated sky to be recognized as a natural sky, and thus a means for resolving the above-described problems is being requested. Incidentally, unnaturalness of luminescence from a light-emitting part caused by the unnatural luminance distribution due to the frame member is not limited to illumination devices simulating the sky but can be considered to occur in a similar manner also to illumination devices performing uniform illumination and the like.

An object of the present invention, which has been made to resolve the above-described problems, is to provide an illumination device capable of realizing more natural luminescence (light emission) by inhibiting the unnatural luminance distribution of the light-emitting part due to the frame provided in front of the light-emitting part.

Means for Solving the Problem

An illumination device according to an aspect of the present invention simulates the sky and includes a light source that emits first light, a light-emitting part that allows the first light to enter, guides the entered first light by means of total reflection while scattering the first light, and emits the scattered light from a light emission surface, a back surface reflective part that is provided to face a back surface as a surface of the light-emitting part on a side opposite to the light emission surface and reflects light emitted from the back surface of the light-emitting part, a frame that includes a part situated at least in front of the light emission surface of the light-emitting part, and an optical member that is provided between the light emission surface of the light-emitting part and the part of the frame and reflects a part of the light emitted from the light emission surface of the light-emitting part.

Effect of the Invention

According to the present invention, more natural luminescence can be realized by inhibiting the unnatural luminance distribution of the light-emitting part due to the frame provided in front of the light-emitting part.

MODE FOR CARRYING OUT THE INVENTION

Illumination devices according to embodiments of the present invention will be described below with reference to the drawings. In the drawings, the same or similar components are assigned the same reference character. Further, the dimensions and reduction scale of each component illustrated in the drawings can vary from drawing to drawing. The following embodiments are just examples and a variety of modifications are possible within the scope of the present invention.

Coordinate axes of an XYZ orthogonal coordinate system are shown in the drawings. A Z-axis is a coordinate axis in a direction orthogonal to a front surface as a light emission surface of a light-emitting part of the illumination device. In the drawings, a light-emitting panel is shown as the light-emitting part. An X-axis and a Y-axis are coordinate axes in directions orthogonal to the Z-axis. When the illumination device is attached to a ceiling, a +Z-axis direction is a downward vertical direction, a −Z-axis direction is an upward vertical direction, and an X-axis direction and a Y-axis direction are horizontal directions.

(1) First Embodiment

<Illumination Device>

Figure 1:
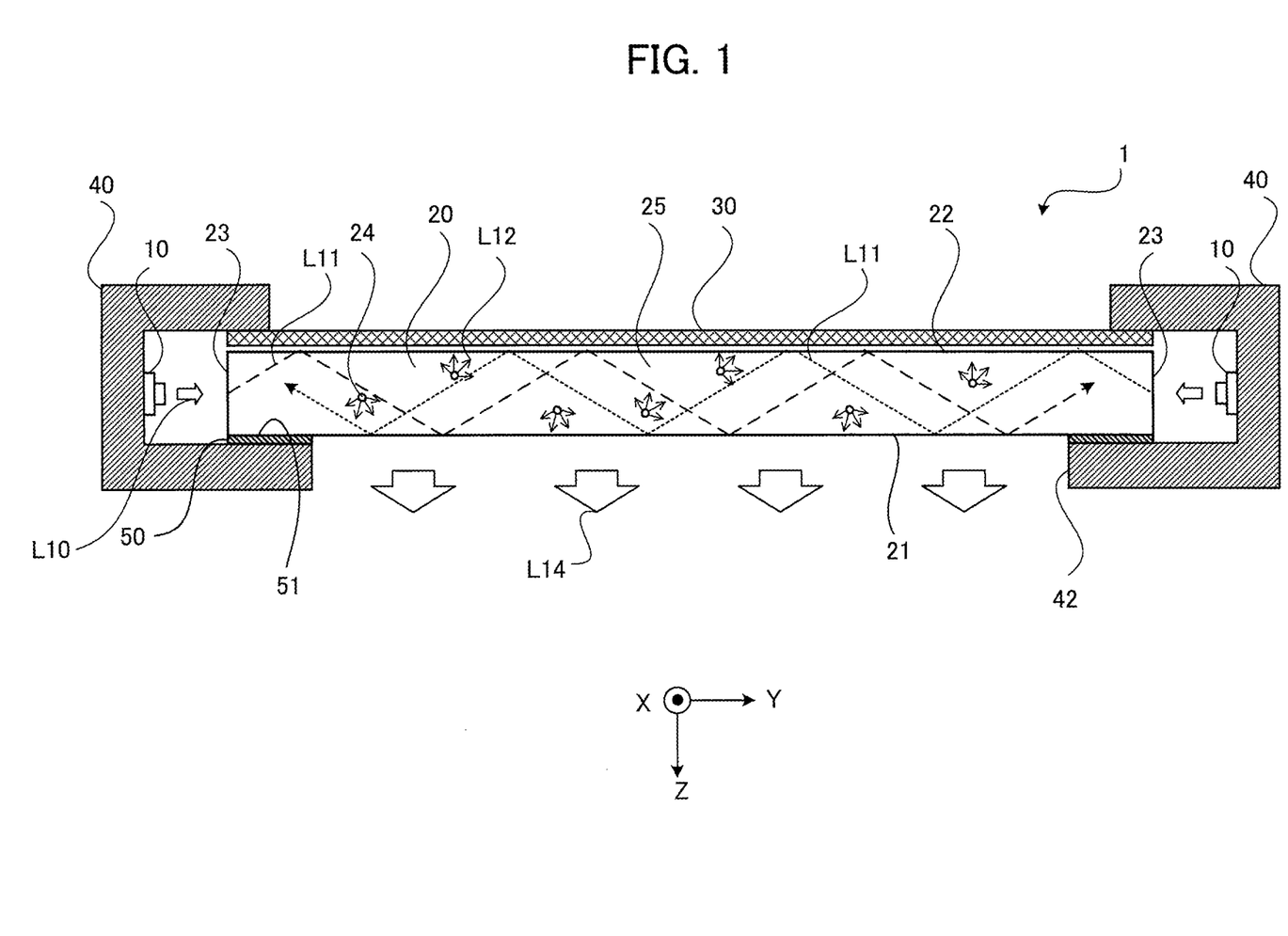
FIG. 1 is a cross-sectional view schematically showing a configuration of an illumination device according to a first embodiment of the present invention.
Figure 2:
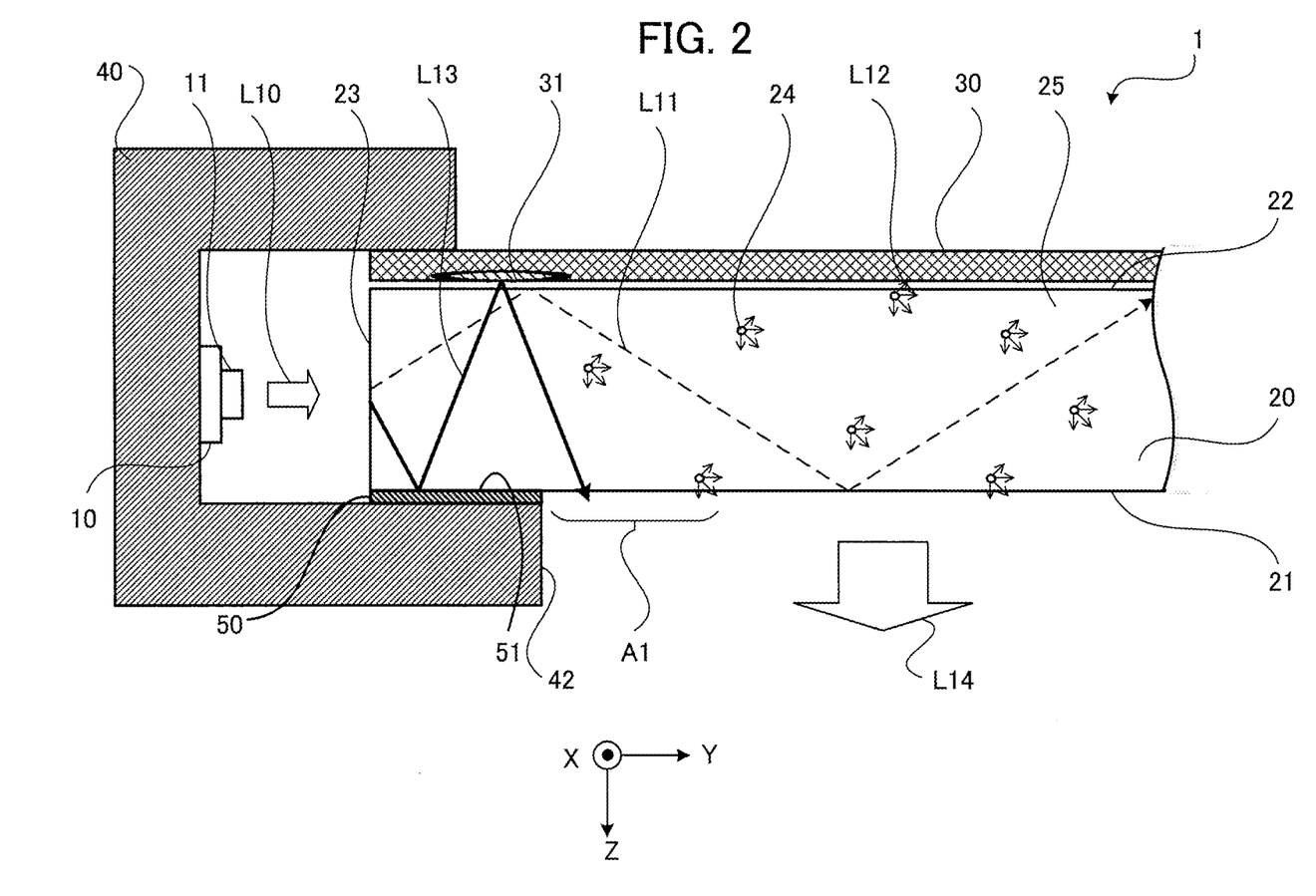
FIG. 2 is an enlarged sectional view schematically showing a configuration of a principal part of the illumination device according to the first embodiment.
Figure 3:
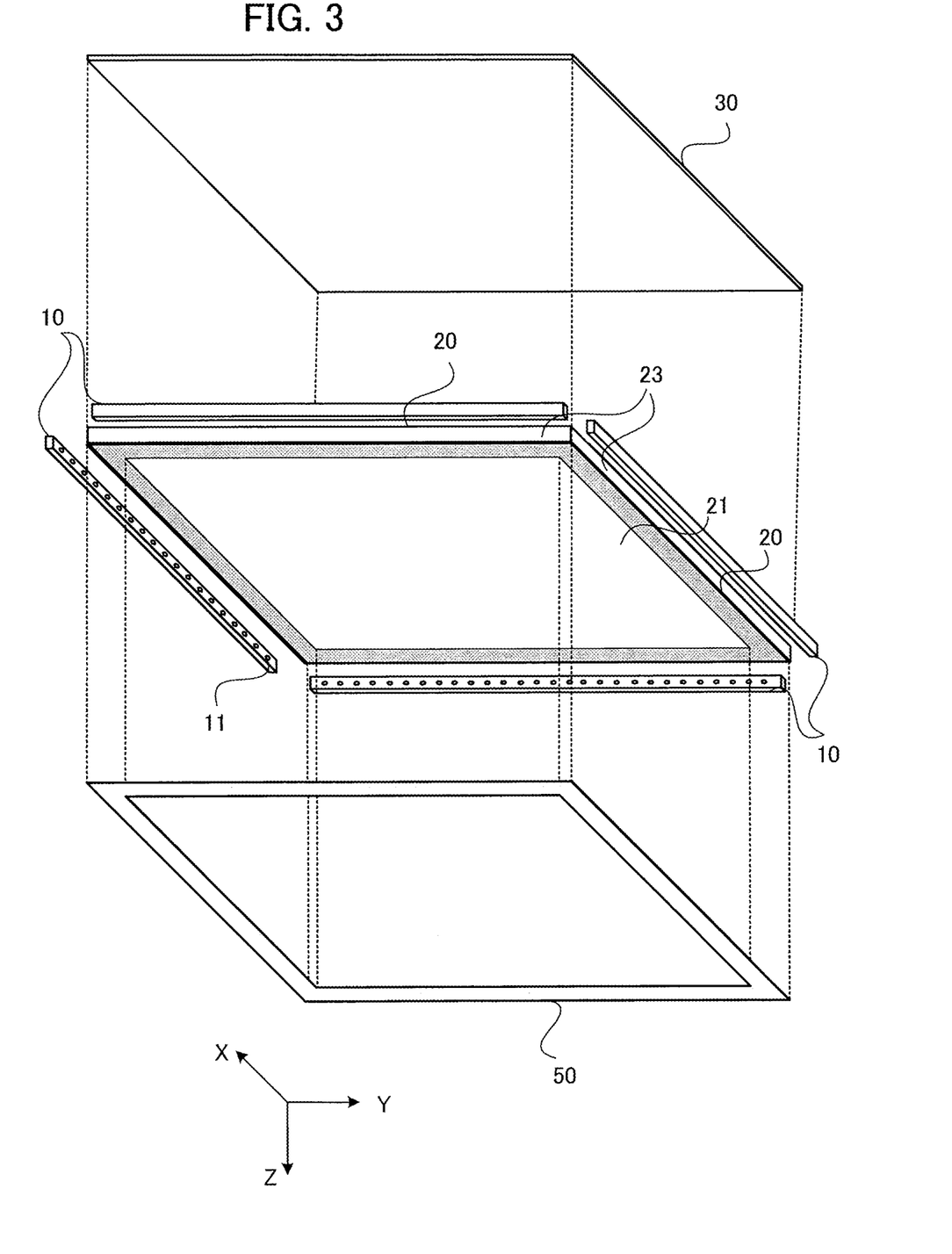
FIG. 3 is an exploded perspective view schematically showing a reflective member, a light-emitting part, light sources and an optical member of the illumination device according to the first embodiment.
Figure 4:
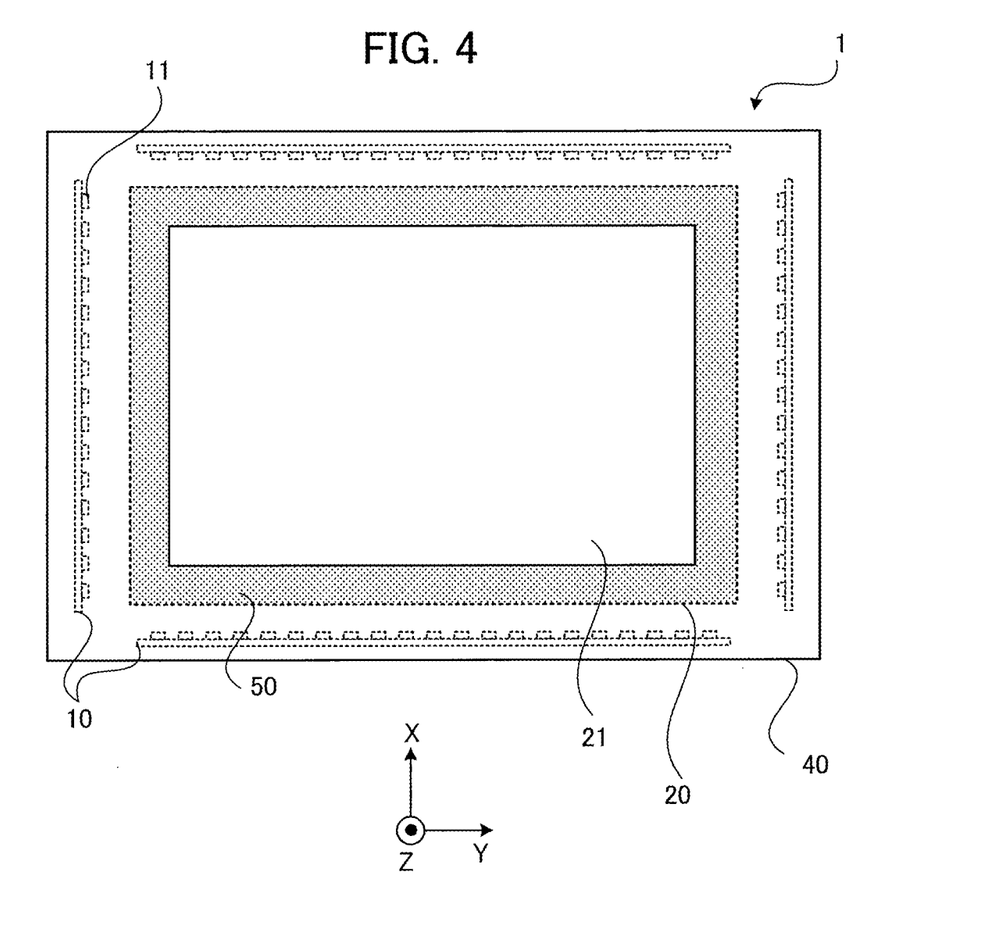
FIG. 4 is a bottom view schematically showing a configuration of the illumination device according to the first embodiment.

FIG. 1 is a cross-sectional view schematically showing a configuration of an illumination device 1 according to a first embodiment. FIG. 2 is an enlarged sectional view schematically showing a configuration of a principal part of the illumination device 1. FIG. 3 is an exploded perspective view schematically showing a reflective member 30, a light-emitting part 20, light sources 10 and an optical member 50 of the illumination device 1. FIG. 4 is a bottom view schematically showing a configuration of the illumination device 1. As shown in these drawings, the illumination device 1 includes the light sources 10, the light-emitting part 20, the reflective member 30, a frame 40 and the optical member 50.

<Light Source 10>

The light source 10 emits light L10. The light source 10 is referred to also as a "first light source". The light source 10 emits the light L10 towards the light-emitting part 20, for example. However, it is also possible to provide a member for guiding the light L10, such as a light guide path or a mirror, between the light source 10 and the light-emitting part 20. The light source 10 is arranged to face a side face 23 of the light-emitting part 20, for example. The side face 23 is referred to also as an "edge part". The light source 10 is, for example, a light-emitting element array including a plurality of light-emitting elements 11 arrayed in a line. The light-emitting element is a light-emitting diode (LED), for example. The plurality of light-emitting elements 11 may also be arrayed in two or more lines. Incidentally, the light source 10 is not limited to a light-emitting element array but can also be a long-shaped lamp light source or the like. While four light sources 10 are shown in FIG. 3, the number of the light sources 10 can also be three or less or five or more.

<Light-Emitting Part 20>

The light-emitting part 20 allows the light L10 as the first light to enter, guides the entered light by means of total reflection while scattering the light, and emits the scattered light from the light emission surface. The light-emitting part 20 is, for example, a plate-shaped light guide member having a front surface 21, a back surface 22 on a side opposite to the front surface 21, and side faces 23 connecting the front surface 21 and the back surface 22 to each other. The front surface 21 is a surface on an observer's side. The front surface 21 is referred to also as the "light emission surface" or a "first surface". The back surface 22 is referred to also as a "second surface" or a "back surface". However, the shape of the light-emitting part 20 is not limited to a plate-like shape but can also be a different shape such as a rod-like shape.

The light-emitting part 20 is formed with a base material 25 having light permeability and particles 24 dispersed in the base material 25, for example. The base material 25 is a plate-shaped member, for example. The particles 24 are particles that scatter light and are referred to also as a scattering material. The particles 24 scatter light traveling in the base material 25.

As an example, the particles 24 are nanoparticles, for instance. The "nanoparticles" are particles having size on the nanometer (nm) order. In general, the nanoparticles mean particles having size from 1 nm to some hundreds of nm (e.g., 300 nm). The particles 24 are particles whose grain diameter is on the nanometer order, for example.

The particle 24 can take a spherical shape or a different shape.

The light-emitting part 20 can include a plurality of types of particles 24. In that case, an average grain diameter may be used as the grain diameter of the particles 24.

The particles 24 are inorganic oxide, for example. The inorganic oxide is $ZnO$, $TiO_2$, $ZrO_2$, $S_1O_2$, $Al_2O_3$ or the like, for example.

The base material 25 may contain the particles 24, for example. Alternatively, the particles 24 may be added to the base material 25. The particles 24 are dispersed in the base material 25, for example.

While the material of the base material 25 is not particularly limited, the material is a transparent material, for example. The base material 25 does not necessarily have to be transparent at all wavelengths of incident light. As an example, the base material 25 may be a member that absorbs light at a particular wavelength among the wavelengths of the incident light.

The transmittance (i.e., straight traveling transmittance) of the base material 25 in a light guide distance 5 mm at a design wavelength is preferably 90% or higher, more preferably 95% or higher, and still more preferably 98% or higher. Here, the design wavelength may be a predetermined wavelength among the wavelengths of the incident light. The design wavelength is not limited to one wavelength but can also be a plurality of wavelengths or a wavelength having a width (i.e., wavelength range). In a case where the incident light is light of white color, for example, the design wavelength may be one or more wavelengths among 450 nm, 550 nm and 650 nm. Incidentally, the design wavelength can also be the three wavelengths 450 nm, 550 nm and 650 nm.

The base material 25 is solid matter, for example. The base material 25 can be, for example, a resin plate made by using a thermoplastic polymer, thermosetting resin, photopolymerization resin or the like. As the resin plate, it is possible to use an acrylic polymer, an olefinic polymer, a vinyl-based polymer, a cellulosic polymer, an amide-based polymer, a fluoric polymer, a urethane-based polymer, a silicone-based polymer, an imide-based polymer or the like. The light-emitting part 20 may be formed by, for example, dispersing the particles 24 in such a material of the base material 25 before the hardening and then executing the hardening process.

The light-emitting part 20 may also be formed with, for example, porous material made by the sol-gel method, organic molecule dispersed material, organic-inorganic hybrid material (referred to also as organic-inorganic nanocomposite material) or metallic particle dispersed material. As an example, the light-emitting part 20 may be organic-inorganic hybrid resin, which can be hybrid resin of resin and inorganic oxide, for example. In this case, the light-emitting part 20 includes inorganic oxide, generated by sol-gel hardening by using the base material 25 including inorganic oxide material and organic compound as the base, as a substance corresponding to the particles 24. Incidentally, in the present application, minute cavities or the like generated by such a production process are also regarded as the particles 24.

Further, the light-emitting part 20 may also be obtained by forming minute concavities and convexities smaller than the wavelength of blue light on the surface of the base material 25. In this case, the light-emitting part 20 includes minute concave parts or convex parts formed on the surface of the base material 25 as the particles 24. In this case, the maximum diameter of the concave parts or the convex parts is desired to be on the nanometer order (e.g., size from 1 nm to some hundreds of nm).

Incidentally, the particles 24 and the base material 25 do not have to be clearly discriminated from each other as different members in the light-emitting part 20. Further, the base material 25 is not limited to solid matter but can also be a liquid, a liquid crystal or a gel-like substance.

As shown in FIG. 1 and FIG. 2, the light entering the light-emitting part 20 through the side face 23 is guided by undergoing total reflection at the front surface 21 and the back surface 22. The light undergoing the total reflection is represented by a reference character L11. Further, a part of the light entering from the side face 23 is scattered by the particles 24. Light caused by the scattering is represented by a reference character L12. Incidentally, the light-emitting part 20 may also have structure in which a plurality of light-permeable members is laminated.

The light entering the light-emitting part 20 through the side face 23 is guided, scattered, and emitted from the front surface 21 or the back surface 22. The haze value of the light-emitting part 20 in the thickness direction of the light-emitting part 20 (i.e., the Z-axis direction) is desired to be within a range of 0.005% to 30%. The haze value of the light-emitting part 20 is more preferably within a range of 0.1% to 15%, and still more preferably within a range of 0.5% to 5%.

The reason for stipulating the upper limit of the haze value of the light-emitting part 20 in the Z-axis direction is that a bright spot on the reflective member 30, i.e., a high luminance region 31, occurring due to reflection of light at the optical member 50, becomes hardly recognizable to the observer when the haze value is sufficiently high. Namely, when the haze value is sufficiently high, the degree of opaqueness of the light-emitting part 20 is high, and thus even supposing that the high luminance region 31 occurs on the back surface 22's side of the light-emitting part 20, the observer situated on the front surface 21's side of the light-emitting part 20 does not recognize the unevenness of the luminance on the front surface 21. In other words, when the haze value is sufficiently high, the reflectance of the optical member 50 has little influence on the condition of the front surface 21 of the light-emitting part 20 of the illumination device 1 observed by the observer.

<Reflective Member 30>

The reflective member 30 is provided to face the back surface as the surface of the light-emitting part 20 on the side opposite to the light emission surface and reflects light emitted from the back surface of the light-emitting part 20. The reflective member 30 is referred to also as a back surface reflective part. A space, namely, an air layer, exists between the reflective member 30 and the back surface 22 of the light-emitting part 20. This configuration is employed so that total reflection occurs at the back surface 22 of the light-emitting part 20. The reflective member 30 reflects light emitted from the back surface 22 of the light-emitting part 20 without satisfying the total reflection condition and directs the light towards the back surface 22, namely, returns the light from the back surface 22 to the light-emitting part 20. The reflective member 30 has a property of reflecting light. The reflective member 30 is a member having a white reflecting surface, for example. For, example, the reflective member 30 is film, sheet metal as plate-shaped metal, a plastic plate, or the like. The reflecting surface of the reflective member 30 can be a diffusive reflecting surface. The diffusive reflecting surface may be formed by means of white painting, for example.

<Frame 40>

The frame 40 includes a part that is situated at least in front of (i.e., on the +Z-axis direction side of) the light emission surface (in this example, the front surface 21 in the drawings) of the light-emitting part 20. The frame 40 includes, for example, the aforementioned part that faces a first region on the front surface 21 and an opening 42 that allows illuminating light L14 as light emitted from a second region on the front surface 21 adjoining the first region to pass through. For example, the first region is a region on an outer peripheral side, and the second region is a region in the vicinity of the center. Incidentally, the first region and the second region on the front surface 21 of the light-emitting part 20 are names for the sake of convenience, there is no physical boundary between the first region and the second region, and the first region and the second region are not limited to the above-described example. Further, the frame 40 does not necessarily have to include the opening (in this case, the opening represents a region whose entire periphery is surrounded by a certain member); the frame 40 may also have a configuration in which two or more members are arranged side by side via a certain gap or the like, for example. In such cases, the gap(s) may be regarded as the opening that allows the illuminating light L14 to pass through. In other words, in the light-emitting part 20, a region facing the frame 40 situated in front may be regarded as the first region and a region facing no frame 40 situated in front may be regarded as the second region.

The frame 40 is formed of metal, plastic or the like. The frame 40 can be a housing of the illumination device 1 or a part of the housing. The frame 40 can be a design-oriented member having both designability and functionality. The opening 42 is a space with no object existing therein, or a light-permeable member through which light can pass. In FIG. 1 and FIG. 2, the first region is a region including outer peripheral edges of the front surface 21 as sides of the side faces 23 of the light-emitting part 20.

<Optical Member 50>

The optical member 50 is provided between the light-emitting part 20 and the frame 40 and reflects a part of the light emitted from the front surface 21 of the light-emitting part 20 (especially, light emitted from the region facing the frame 40 situated in front included in the light emitted from the front surface 21). More specifically, the optical member 50 is arranged between the light-emitting part 20 and the frame 40, especially in an optical path of light emitted from the front surface 21 of the light-emitting part 20 and reaching the frame 40. Incidentally, as viewed in a top view, the optical member 50 may be arranged in a region where the front surface 21 of the light-emitting part 20 and the frame 40 overlap with each other. The optical member 50 may have, for example, a top surface 51 as a surface facing the first region. The top surface 51 is referred to also as a "third surface". Incidentally, the optical member 50 may be either in contact or not in contact with the front surface 21 of the light-emitting part 20 and the frame 40. For example, the optical member 50 may include an air layer or the like at a position between the optical member 50 and the light-emitting part 20, a position between the optical member 50 and the frame 40, or at each of the positions. A part of the light emitted from the first region of the light-emitting part 20 is reflected by the top surface 51 of the optical member 50, for example, and advances from the first region to the inside of the light-emitting part 20. Incidentally, the optical member 50 is not necessarily limited to an optical member that reflects light at the top surface 51; it is permissible if the optical member 50 at least reflects the light incident thereon. Further, the optical member 50 does not need to reflect all of the light incident on the optical member 50. In other words, the reflectance of the optical member 50 may be lower than 100%.

The optical member 50 is formed of paint, film, paper, resin or the like, for example. The optical member 50 may also be formed integrally with the frame 40. Namely, an edge part of the frame 40 facing the front surface 21 of the light-emitting part 20 may be formed by the optical member 50. As an example, an upper surface of the frame 40 (a surface forming the edge part facing the front surface 21 of the light-emitting part 20) may be formed by the optical member 50.

The reflectance of the optical member 50 is within a range of 20% to 60%. The reflectance of the optical member 50 is more preferably within a range of 45% to 55%. Here, the aforementioned range of the reflectance may be paraphrased as reflectance of light incident on the optical member 50 from the top surface 51's side. However, the aforementioned range of the reflectance is applicable also to light other than the light incident from the top surface 51's side.

The reason for stipulating the upper limit of the reflectance of the optical member 50 is that the luminance in the high luminance region 31 of the reflective member 30 occurring due to reflection of light at the optical member 50 increases and the high luminance region 31 becomes likely to be recognized by the observer as a bright spot when the reflectance is too high. Namely, when the reflectance of the optical member 50 is too high, the observer situated on the front surface 21's side of the light-emitting part 20 strongly recognizes the high luminance region 31 appearing on the back surface 22's side of the light-emitting part 20. The observer recognizing such unevenness of the luminance is unlikely to feel the light emitted by the illumination device 1 as natural luminescence. As shown in FIG. 2, in the first embodiment, the observer recognizes the bright spot in a vicinal region A1 of a frame 40 on the front surface 21 of the light-emitting part 20. In this case, the observer might have a feeling of unnaturalness by recognizing the existence of the reflective member 30 provided for the purpose of increasing the light utilization efficiency, by feeling that another region (especially, a peripheral region) is darker, or the like.

The reason for stipulating the lower limit of the reflectance of the optical member 50 is that the luminance in a low luminance region as a dark spot on the reflective member 30 occurring due to reflection of light at the optical member 50 decreases and the low luminance region becomes likely to be recognized by the observer as a dark spot when the reflectance is too low. Namely, when the reflectance of the optical member 50 is too low, the observer situated on the front surface 21's side of the light-emitting part 20 strongly recognizes the low luminance region appearing on the back surface 22's side of the light-emitting part 20. Similarly to the aforementioned case, the observer recognizing such unevenness of the luminance is unlikely to feel the light emitted by the illumination device 1 as natural luminescence. In the first embodiment, the observer recognizes the dark spot in the vicinal region A1 of the frame 40 on the front surface 21 of the light-emitting part 20. Also in this case, the observer might have a feeling of unnaturalness by recognizing the existence of the reflective member 30 provided for the purpose of increasing the light utilization efficiency, by feeling another region (especially, the peripheral region) to be brighter, or the like.

Brightness of each position on the front surface 21 of the light-emitting part 20 recognized by the observer situated on the front surface 21's side of the illumination device 1 is determined depending on the amount of light emitted from each position. The light emitted from the front surface 21 of the light-emitting part 20 includes the following light (L1) to (L4), for example:

(L1) Light heading for the front surface 21 included in the scattered light occurring in the light-emitting part 20.

(L2) Light emitted from the back surface 22 and thereafter reflected by the reflective member 30 and heading for the front surface 21 included in the scattered light occurring in the light-emitting part 20.

(L3) Light entering the light-emitting part 20 through the side face 23 and being incident on the front surface 21 at an angle not satisfying the total reflection condition.

(L4) Returning light of external light. The returning light of the external light is light emitted from the illumination device 1, reflected by a wall, a floor or the like of a room, entering the light-emitting part 20 through the front surface 21, reflected by the reflective member 30, and heading for the front surface 21.

Since a variety of light such as the light (L1) to (L4) is emitted from the light-emitting part 20, if a member having high reflectance (e.g., metallic frame) exists in front of the front surface 21, there is a possibility that light emitted from the front surface 21 is reflected by the frame 40, reaches the reflective member 30, and causes the high luminance region 31. Further, if a member having low reflectance exists in front of the front surface 21, there is a possibility that a shadow of the low reflectance member reaches the reflective member 30 and causes the low luminance region. In order to prevent the occurrence of such a bright spot or dark spot, it is desirable to set the reflectance of the optical member 50 in the aforementioned range of the reflectance. The reflectance of the optical member 50 is, for example, reflectance of the optical member 50 for light incident on the optical member 50 from the top surface's side.

<Control System>

Figure 5:
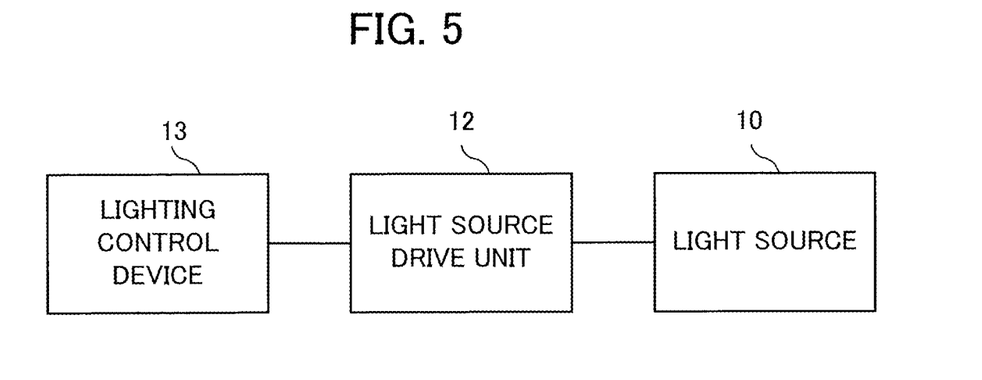
FIG. 5 is a functional block diagram schematically showing a configuration of a control system of the illumination device according to the first embodiment.

FIG. 5 is a functional block diagram schematically showing a configuration of a control system of the illumination device 1. As shown in FIG. 5, the illumination device 1 includes a light source drive unit 12 as a drive circuit that performs lighting, light control or extinction of the light sources 10 and a lighting control device 13 as a control circuit that controls the light source drive unit 12, for example. The lighting control device 13 may include a memory that stores a program and a processor that executes the program. The lighting control device 13 is capable of controlling the lighting, the light control and the extinction of the light sources 10 so as to have certain relevancy to the time of day, the weather or the season, for example. The light control may include adjustment of the intensity of the light and adjustment of the color of the light.

<Effect>

As described above, by using the illumination device 1, more natural luminescence can be realized by inhibiting the unnatural luminance distribution of the light-emitting part 20 due to the frame 40 provided in front of the light-emitting part. Namely, by using the illumination device 1, it is possible to realize luminescence not giving a feeling of unnaturalness to the observer, that is, luminescence not making the observer feel something unnatural. For example, the observer can feel that a window through which natural light enters is being simulated by the illumination device 1. Namely, the observer can feel that a simulated sky is being reproduced by the illumination device 1.

<Modification>

Figure 6:
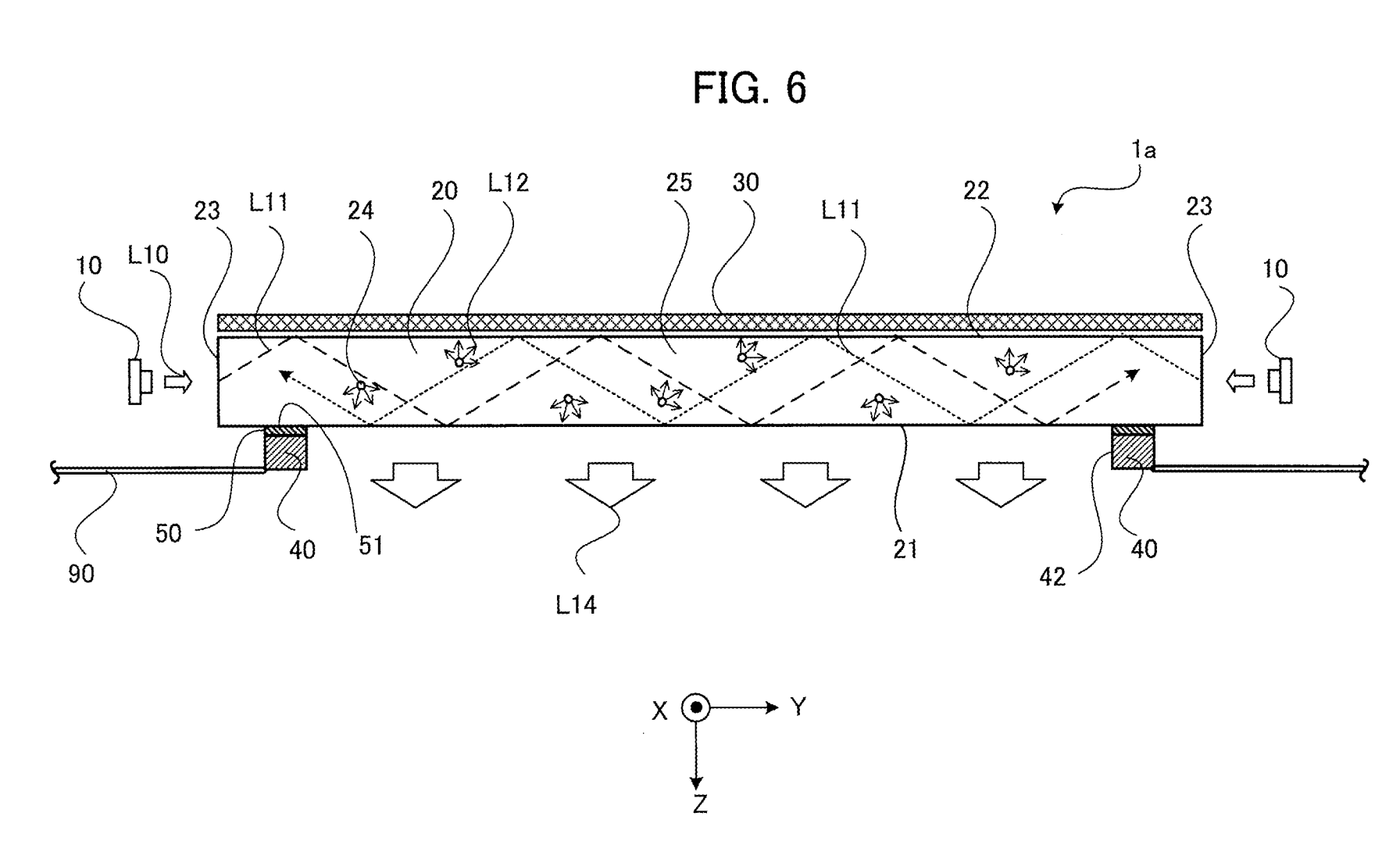
FIG. 6 is a cross-sectional view schematically showing a configuration of an illumination device according to a modification of the first embodiment.
Figure 7:
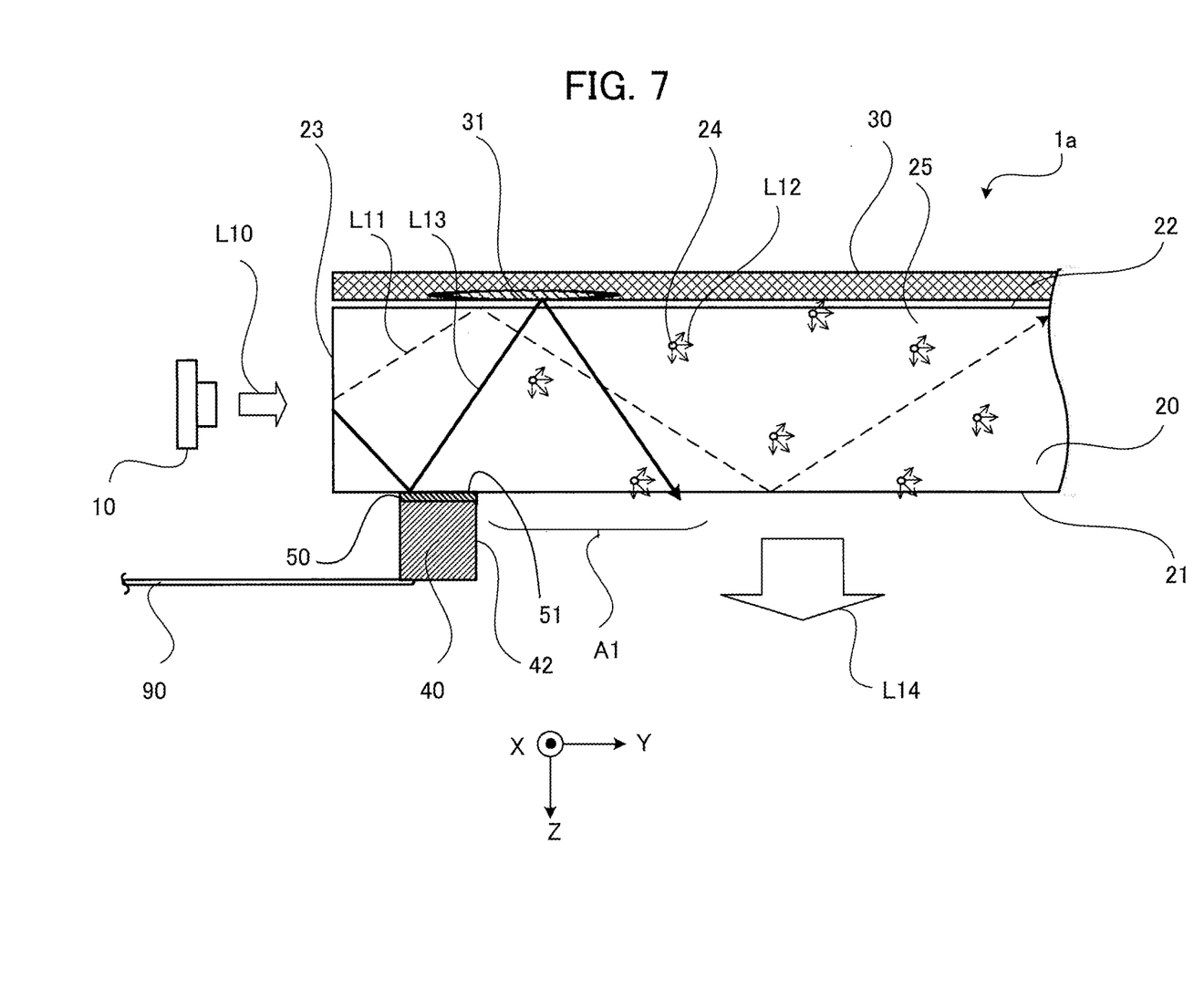
FIG. 7 is an enlarged sectional view schematically showing a configuration of a principal part of the illumination device according to the modification of the first embodiment.

FIG. 6 is a cross-sectional view schematically showing a configuration of an illumination device 1a according to a modification of the first embodiment. FIG. 7 is an enlarged sectional view schematically showing a configuration of a principal part of the illumination device 1a. FIG. 6 and FIG. 7 illustrate a case where the illumination device 1a is attached to a ceiling 90. As shown in FIG. 6 and FIG. 7, the frame may also be situated at a position apart from the ends of the light-emitting part 20. In other words, the first region on the front surface 21 of the light-emitting part 20 can be a region not including the outer peripheral edges of the front surface 21. According to the illumination device 1a, the configuration can be simplified compared to the illumination device 1.

(2) Second Embodiment

<Illumination Device 2>

Figure 8:
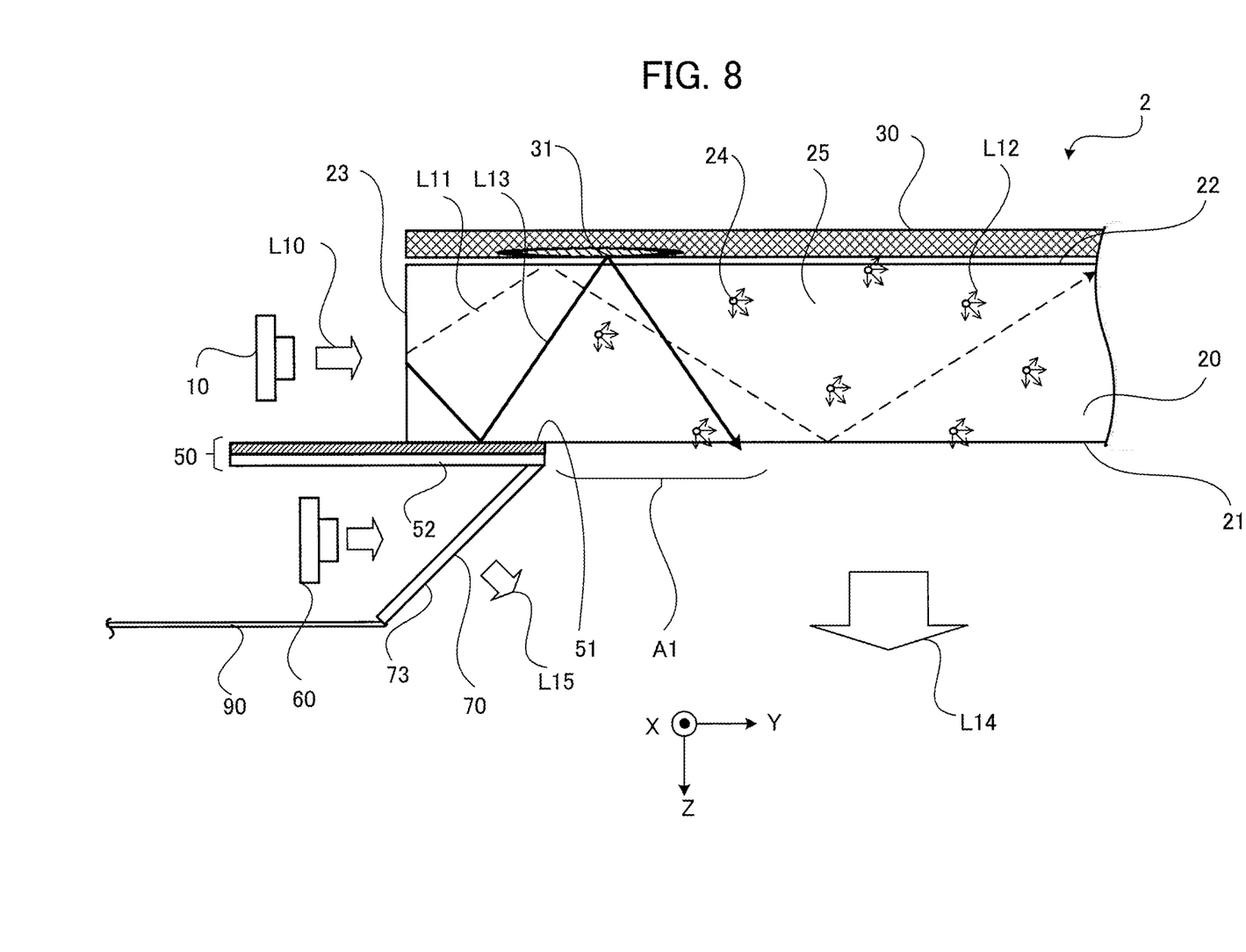
FIG. 8 is an enlarged sectional view schematically showing a configuration of a principal part of an illumination device according to a second embodiment of the present invention.

FIG. 8 is a cross-sectional view schematically showing a configuration of a principal part of an illumination device 2 according to a second embodiment. In FIG. 8, each component identical or corresponding to a component shown in FIG. 2 is assigned the same reference character as in FIG. 2. The illumination device 2 according to the second embodiment differs from the illumination device 1 according to the first embodiment in the shape of a frame 70 and in including light sources 60. Except for these features, the second embodiment is the same as the first embodiment.

<Light Source 60>

The light source 60 emits light. The light source 60 is referred to also as a "second light source". The light source 60 is arranged outside the frame 70. The light source 60 has the same configuration as the light source 10. However, the light source 60 may also have a configuration different from that of the light source 10. Further, instead of the light source 60, it is also possible to provide a light branching member or a light guide member that directs a part of the light emitted from the light source 10 towards the frame 70.

<Frame 70>

The frame 70 includes wall-like parts 73 at the front surface 21 of the light-emitting part 20. The frame 70 is a light-permeable member, for example. The frame 70 may include a light diffusing material that diffuses light. The frame 70 is formed to surround a space in front of the front surface 21. The frame 70 may be inclined with respect to a normal line to the front surface 21 so that the space in front of the front surface 21 widens with the increase in the distance from the front surface 21. While the frame 70 is formed of four faces, the number of the parts 73 forming the frame 70 can differ from four. Further, the frame 70 may include a curved surface. Light from the light source 60 (referred to also as "second light") enters the frame 70, undergoes transmission and diffusion, and thereafter emerges from a front surface of the frame 70.

The optical member 50 has the top surface 51 as a surface facing the front surface's side of the light-emitting part 20 and an under surface 52 as a surface facing the frame 70's side. The under surface 52 is referred to also as a "fourth surface". In the case where the frame 70 is a light-permeable member, the reflectance of the top surface 51 is desired to be set lower than the reflectance of the under surface 52. The frame 70 is formed of resin, glass, film or the like, for example. The reflectance of the under surface 52 is desired to be higher than or equal to 70%. The reflectance of the under surface 52 is more preferably higher than or equal to 90%. Here, the reflectance of the top surface 51 of the optical member 50 and the reflectance of the under surface 52 of the optical member 50 may be respectively paraphrased as reflectance of the optical member 50 for light incident on the optical member 50 from the top surface 51's side (e.g., light traveling in the +Z direction in the drawing) and reflectance of the optical member 50 for light incident on the optical member 50 from the under surface 52's side (e.g., light traveling in the −Z direction in the drawing).

The light source 60 is arranged outside the frame 70 and radiates light from the outside of the frame 70. The light emitted from the light source 60 passes through the frame 70, or undergoes diffusion and transmission, and is emitted to the space in front of the front surface 21 as light L15. When the light-emitting part 20 simulates a window, the frame 70 is capable of simulating a window frame.

Figure 9:
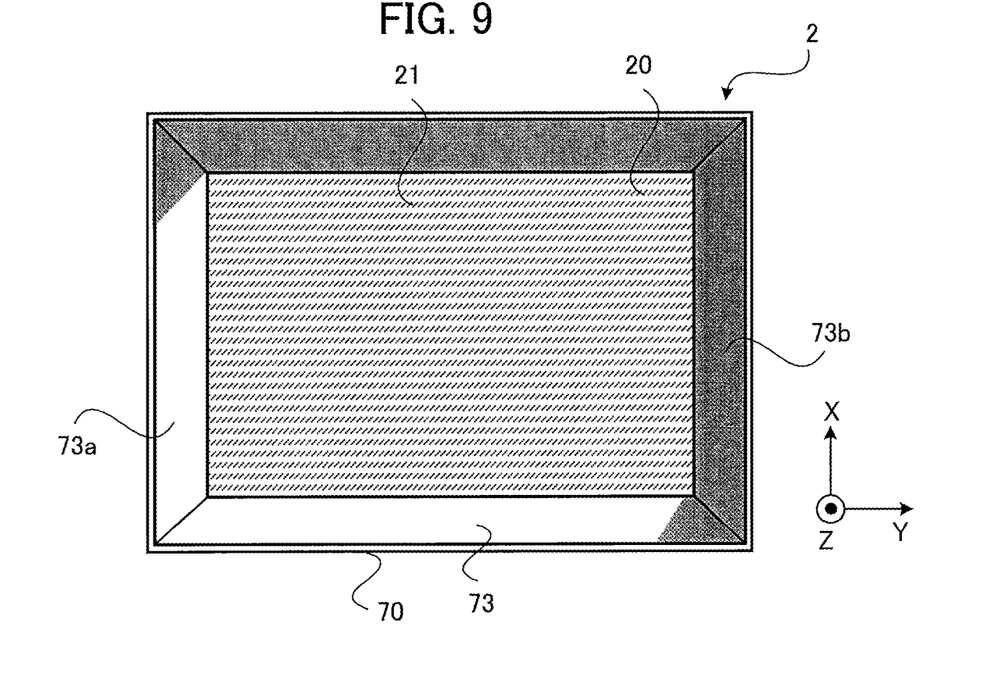
FIG. 9 is a bottom view showing an example of a bright part region and a dark part region of a frame of the illumination device according to the second embodiment.
Figure 10:
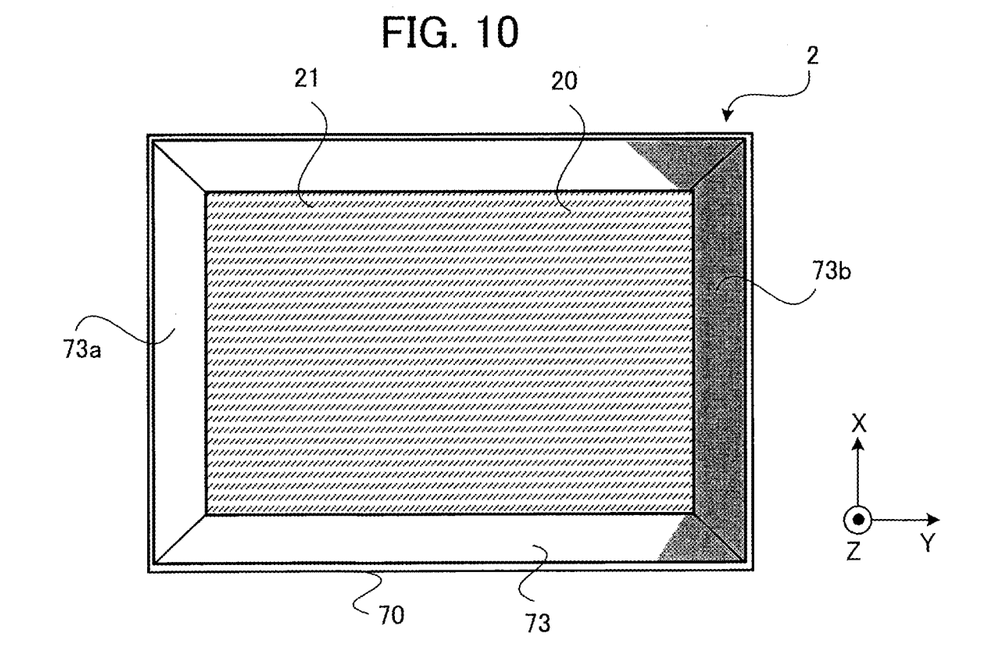
FIG. 10 is a bottom view showing another example of the bright part region and the dark part region of the frame of the illumination device according to the second embodiment.

FIG. 9 is a bottom view showing an example of a bright part region 73a and a dark part region 73b of the frame 70 of the illumination device 2. FIG. 10 is a bottom view showing another example of the bright part region 73a and the dark part region 73b of the frame 70. The bright part region 73a is a region where light transmittance is high, and the dark part region 73b is a region where the light transmittance is lower than in the bright part region 73a. The observer can feel the bright part region 73a and the dark part region 73b as a sunny part and a shady part formed on the window frame. In other words, the observer can feel as if actual solar light, that is, natural light, were coming in through the light-emitting part 20.

<Control System>

Figure 11:
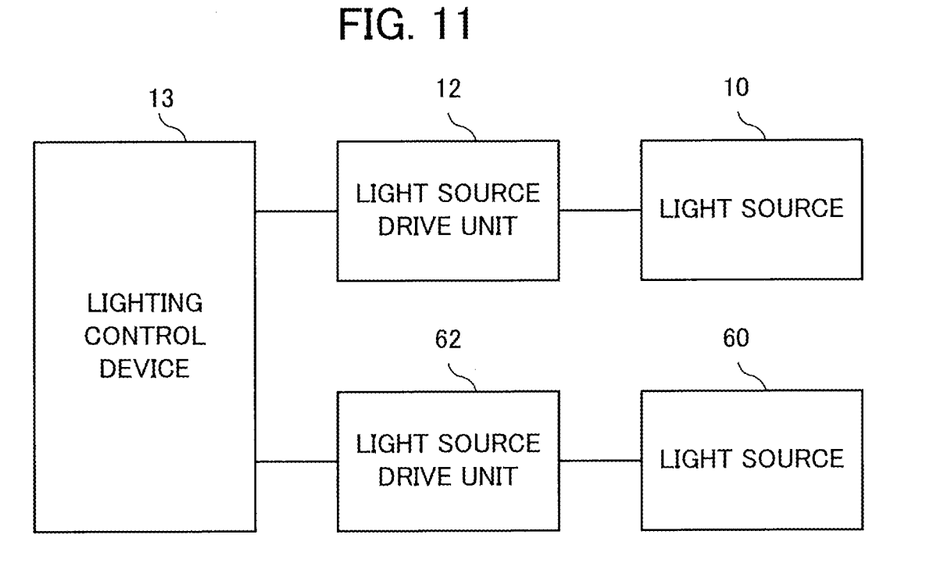
FIG. 11 is a functional block diagram schematically showing a configuration of a control system of the illumination device according to the second embodiment.

FIG. 11 is a functional block diagram schematically showing a configuration of a control system of the illumination device 2. In FIG. 11, each component identical or corresponding to a component shown in FIG. 5 is assigned the same reference character as in FIG. 5. As shown in FIG. 11, the illumination device 2 includes a light source drive unit 62 as a drive circuit that performs lighting, light control or extinction of the light sources 60 and a lighting control device 13 as a control circuit that controls the light source drive unit 62. The lighting control device 13 may include a memory that stores a program and a processor that executes the program. The lighting control device 13 is capable of controlling the lighting, the light control and the extinction of the light sources 10 and the light sources 60 so as to have certain relevancy to the time of day, the weather or the season, for example. The light control may include adjustment of the intensity of the light and adjustment of the color of the light.

<Effect>

As described above, by using the illumination device 2, more natural luminescence can be realized by inhibiting the unnatural luminance distribution of the light-emitting part 20 due to a member provided in front of the light-emitting part 20. For example, the observer can feel that a window through which natural light enters is being simulated by the illumination device 2. Namely, the observer can feel that a simulated sky is being reproduced by the illumination device 2.

(3) Modification

It is possible to appropriately combine the configurations of the first embodiment, the modification of the first embodiment, and the second embodiment described above.

DESCRIPTION OF REFERENCE CHARACTERS 1, 1a, 2: illumination device, 10: light source, 20: light-emitting part, 21: front surface, 22: back surface, 23: side face, 24: particle, 30: reflective member, 31: bright spot, 40: frame, 42: opening, 50: optical member, 51: top surface, 52: under surface, 60: light source, 70: frame, 73: part, 73a: bright part region, 73b: dark part region.

What is claimed is:

1. An illumination device that simulates the sky; comprising:
   a light source that emits first light;
   a light-emitting part that allows the first light to enter, guides the entered first light by means of total reflection while scattering the first light, and emits the scattered light from a light emission surface;
   a back surface reflective part that is provided to face a back surface as a surface of the light-emitting part on a side opposite to the light emission surface and reflects light emitted from the back surface of the light-emitting part;
   a frame that includes a part situated at least in front of the light emission surface of the light-emitting part; and
   an optical member that is provided between the light emission surface of the light-emitting part and the part of the frame and reflects a part of the light emitted from the light emission surface of the light-emitting part,
   wherein the frame includes a light-permeable member.

2. The illumination device according to claim 1, wherein the frame simulates a window frame and is provided at at least one position on an edge part of the light-emitting part or in a vicinity of the light-emitting part.

3. The illumination device according to claim 1, wherein the frame includes a wall-like part of a light-permeable member.

4. The illumination device according to claim 1, wherein as viewed in a top view, the optical member is arranged in a region where a front surface of the light-emitting part and the frame overlap with each other, the front surface being a surface having the light emission surface.

5. The illumination device according to claim 1, wherein the optical member is situated at a position apart from the ends of the light-emitting part.

6. The illumination device according to claim 1, wherein reflectance of the optical member is 20% to 60%.

7. The illumination device according to claim 1, further comprising a light source that emits second light,
   wherein the second light enters the frame, undergoes transmission and diffusion, and thereafter emerges from a front surface of the frame.

8. The illumination device according to claim 1, wherein the optical member has a first surface facing the light emission surface's side of the light-emitting part and a second surface facing the part of the frame, and reflectance differs between the first surface and the second surface.

9. The illumination device according to claim 8, wherein the reflectance of the first surface of the optical member is 20% to 60% and the reflectance of the second surface of the optical member is higher than or equal to 70%.

10. The illumination device according to claim 1, wherein the haze value of the light-emitting part in a thickness direction thereof is 0.005% to 30%.

11. The illumination device according to claim 1, wherein the light-emitting part is a Rayleigh scatterer that causes scattered light by using Rayleigh scattering.

12. The illumination device according to claim 1, wherein the light source is provided to face an edge face of the light-emitting part.

13. The illumination device according to claim 1, wherein the frame is provided at at least one position on an edge part of the light-emitting part or in a vicinity of the light-emitting part and includes a bright part region and a dark part region.

14. An illumination device that simulates the sky, comprising:
   a light source that emits first light;
   a light-emitting part that allows the first light to enter, guides the entered first light by means of total reflection while scattering the first light, and emits the scattered light from a light emission surface;
   a back surface reflective part that is provided to face a back surface as a surface of the light-emitting part on a side opposite to the light emission surface and reflects light emitted from the back surface of the light-emitting part;
   a frame that includes a part situated at least in front of the light emission surface of the light-emitting part; and
   an optical member that is provided between the light emission surface of the light-emitting part and the part of the frame and reflects a part of the light emitted from the light emission surface of the light-emitting part, wherein the optical member has a first surface facing the light emission surface's side of the light-emitting part and a second surface facing the part of the frame, and reflectance differs between the first surface and the second surface.

15. An illumination device that simulates the sky, comprising:

a light source that emits first light;

a light-emitting part that allows the first light to enter, guides the entered first light by means of total reflection while scattering the first light, and emits the scattered light from a light emission surface;

a back surface reflective part that is provided to face a back surface as a surface of the light-emitting part on a side opposite to the light emission surface and reflects light emitted from the back surface of the light-emitting part;

a frame that includes a part situated at least in front of the light emission surface of the light-emitting part; and an optical member that is provided between the light emission surface of the light-emitting part and the part of the frame and reflects a part of the light emitted from the light emission surface of the light-emitting part, wherein the frame is provided at at least one position on an edge part of the light-emitting part or in a vicinity of the light-emitting part and includes a bright part region and a dark part region.

\* \* \* \* \*